United States Patent

[11] 3,619,515

[72] Inventor Melvin A. Lace
Prospect Heights, Ill.
[21] Appl. No. 43,046
[22] Filed June 3, 1970
[45] Patented Nov. 9, 1971
[73] Assignee Motorola, Inc.
Franklin Park, Ill.

[54] SELF-POWERED ADAPTER CARTRIDGE FOR TAPE PLAYERS
6 Claims, 4 Drawing Figs.

[52] U.S. Cl. 179/100.11
[51] Int. Cl. G11b 31/00
[50] Field of Search 179/100.11, 100.22; 325/311

[56] References Cited

UNITED STATES PATENTS
2,936,342 5/1960 Kallmann 179/100.2 MD
OTHER REFERENCES
Bulletin, Universal Radio Pack Tuner, Feb. 68 (Copy in 179-100.11)

*Primary Examiner*—Bernard Konick
*Assistant Examiner*—Raymond F. Cardillo, Jr.
*Attorney*—Mueller and Aichele

ABSTRACT: An adapter cartridge of the type having a radio built therein to be inserted into a tape player to convert the same into a radio receiver. The adapter is provided with a generator to rotate under the influence of the capstan drive of the tape player receiving the cartridge and the generator supplies operating power to the radio.

INVENTOR.
MELVIN A. LACE
BY Mueller & Aichele
ATTORNEYS.

SELF-POWERED ADAPTER CARTRIDGE FOR TAPE PLAYERS

BACKGROUND OF THE INVENTION

This invention relates generally to adapter cartridges for insertion into tape players, and has particular utility in connection with adapter cartridges of the type housing a small radio therein to convert the tape player to a radio receiver unit.

Heretofore, adapter cartridges have been provided which contain radio receiver units within the cartridge to be inserted into a tape player in the place of a conventional tape cartridge. The adapter cartridge so inserted then converts the tape player to a radio receiver. These adapters include a self-contained battery within the adapter cartridge which serves to power the radio. The battery within the cartridge deteriorates even when the adapter cartridge is not used. Therefore, it may occur that the battery will become inoperative at an inopportune moment when it is desirous to play the radio.

SUMMARY OF THE INVENTION

An object of this invention is to provide an adapter cartridge for insertion into a tape player which includes means to develop operating potential in response to the power obtained from a rotating capstan of the tape player receiving the cartridge.

A feature of this invention is the utilization of a small generator having output leads coupled to a power utilization device, such as a small radio, within the cartridge and which generator is drivingly coupled to the capstan shaft of the tape player receiving the same.

BRIEF DESCRIPTION OF THE DRAWINGS

Like reference numerals throughout the various views of the drawings are intended to designate the similar elements or components.

DESCRIPTION OF THE PREFERRED EMBODIMENTS

Figure 1:
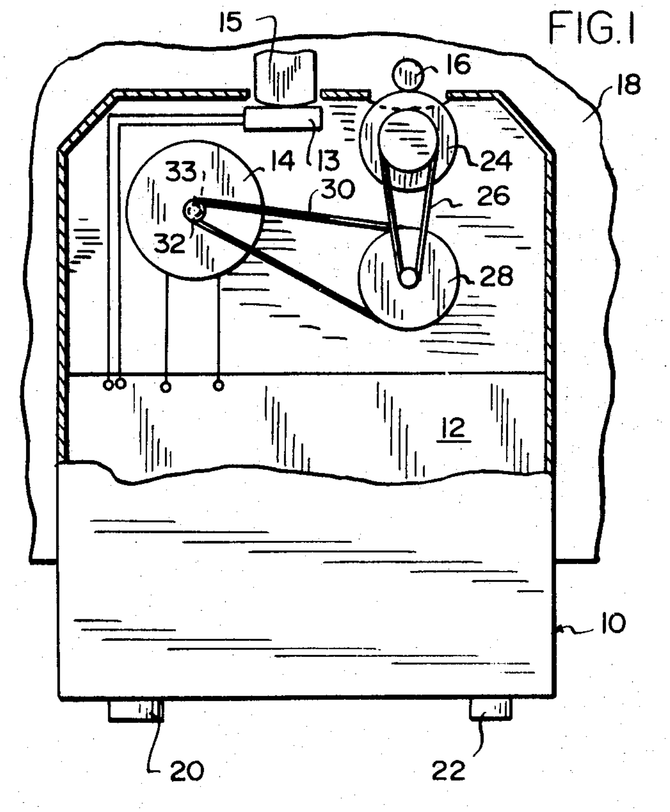
FIG. 1 is a plan view of an adapter cartridge constructed in accordance with this invention showing portions thereof broken away and engaged with a tape player of which only a fragmentary portion is illustrated.

Seen in FIG. 1 is an adapter cartridge designated generally by reference numeral 10 and which contains a power utilization device 12, preferably, a small AM or FM or AM-FM radio receiver. The adapter cartridge 10 includes a power generator 14 drivingly coupled to a capstan drive 16 mounted within a tape player 18, only a portion of which is illustrated herein.

The output of the radio 12 is coupled to a transducer device 13 which, in turn, is positioned in abutting relationship with the magnetic tape head 15 of the tape player 18 to induce audio signal information into the tape head for reproduction of the signals received by the radio in the audio portion of the player. Standard control knobs 20 and 22 are provided on the radio.

In the embodiment illustrated in FIG. 1, a pulley drive wheel 24 is mounted for rotation adjacent an opening 25, and the periphery of the drive wheel 24 is exposed through this opening to engage the capstan 16. A pulley or O-ring drive belt 26 is wrapped about a portion of the drive wheel 24 and extends therefrom to engage with a reduced inner diameter pulley portion of a pulley wheel 28. The major diameter portion of the pulley wheel 28 receives a second pulley or O-ring drive belt 30 which, in turn, wraps about a small pulley 32 secured to a drive shaft 33 extending from the generator 14. In the illustrated arrangement, the drive shaft 33 of the generator 14 will rotate at approximately 1,000 r.p.m. to produce ½-watt-maximum power, which is more than sufficient to operate the radio receiver 12. Thus there is a substantial step-up from the r.p.m. of the capstan 16. The voltage output of the generator 14 is substantially constant as governed by the constant speed of rotation of the capstan shaft 16. Typically, the voltage regulation of a generator used in accordance with this invention may be constant within 1 percent.

Figure 2:
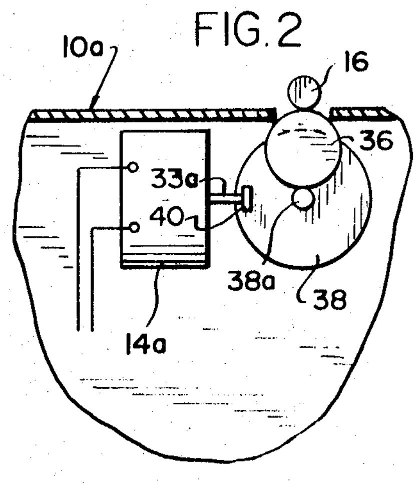
FIG. 2 is a fragmentary portion of an alternate form of adapter cartridge constructed in accordance with this invention.

FIG. 2 illustrates an alternate form of drive coupling between the generator shaft **33*a* and the capstan 16. Here a drive friction wheel 36 is rotatably secured within the adapter cartridge and engages the capstan 16 as illustrated. The drive wheel 36 engages a reduced diameter portion 38*a* of a larger idler wheel 38. The peripheral portion of the idler wheel 38 engages a small drive wheel 40 located at the end of the shaft 33*a* on a generator 14*a*. Here, the small friction wheel 40 engages the top surface of the idler wheel 38** to drive the generator thereby producing a voltage output therefrom.

Figure 3:
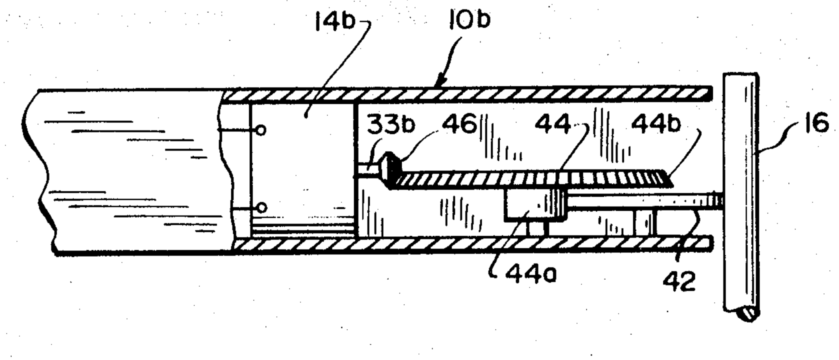
FIG. 3 is an elevational sectional view of yet another alternate form of adapter cartridge constructed in accordance with this invention.

FIG. 3 illustrates still another alternate form of this invention and shows a friction drive wheel 42 engaged with the capstan shaft 16 and with a reduced diameter portion **44*a* of a friction idler wheel 44. The peripheral portion 44*b* of the friction wheel 44 is beveled to conform and engage with a correspondingly beveled friction wheel 46 secured to the output shaft 33*b* of a generator 14*b*. The generator 14*b* has the electrical output thereof coupled to the power utilization means within the adapter cartridge 10*b*. In the embodiments illustrated in FIGS. 1, 2 and 3, the ratio between the capstan 16 and the generator shaft 33, 33*a*, 33*b*** is a step-up ratio of about 18 to 1, it being understood that any suitable ratio may be used.

Figure 4:
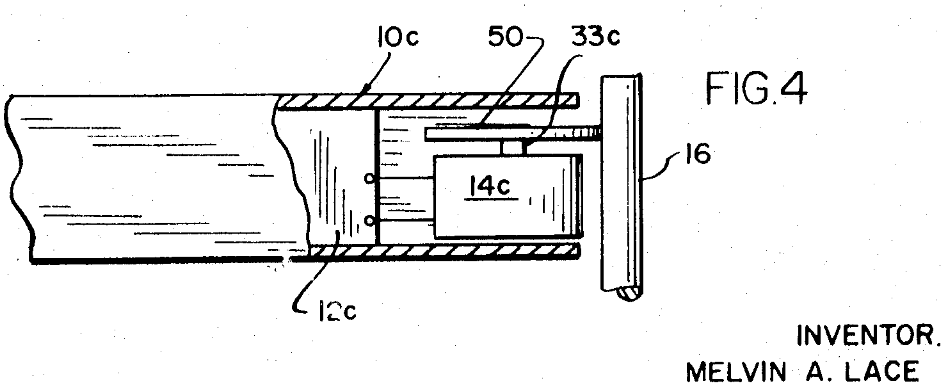
FIG. 4 is yet another alternate form of adapter cartridge constructed in accordance with this invention.

FIG. 4 illustrates still another form of this invention. Here the generator **14*c* is directly driven by the capstan shaft 16 by means of a friction wheel 50 coupled directly to the shaft 33*c* of the generator 14*c*. This arrangement is possible where the capstan shaft 16 rotates at a sufficiently high speed or where the generator 14*c*** is of the type to produce a sufficient output voltage at low speeds.

What has been described is a simple and efficient means for prOviding power within an adapter cartridge to be developed only during periods of time when the cartridge in inserted into a tape player, such power being developed as a result of mechanical power taken from the capstan of the tape player.

Accordingly, variations and modifications of this invention may be effected without departing from the spirit and scope of the novel concepts disclosed and claimed herein.

I claim:

1. For insertion into a tape player having capstan drive means therein to engage with tape transport means in a tape cartridge, an adapter including in combination:
   - a housing;
   - power-consuming means mounted within said housing;
   - an electric power generator positioned within said housing, said generator having a shaft to be rotated and an electrical output connected to said power-consuming means; and
   - means drivingly coupled to said shaft of said generator and arranged to be engaged with the capstan drive of the tape player when the adapter cartridge is inserted therein to rotate said shaft and produce a voltage-current output from said generator to energize said power-consuming means.

2. The apparatus of claim 1 wherein said power-consuming means is a radio having an output transducer device arranged to be positioned adjacent the magnetic tape head of the tape player receiving the adapter cartridge.

3. The apparatus of claim 1 wherein said means drivingly coupled to said shaft includes a first pulley drive wheel having a peripheral surface portion engageable with the capstan and further having a pulley portion, belt means engaging said pulley portion of said first drive wheel and extending therefrom to wrap about a second pulley wheel, said second pulley wheel having a second drive belt extending therefrom to wrap about a pulley formed on said shaft of said generator to rotate the same.

4. The apparatus of claim 1 wherein said means drivingly coupled to said shaft includes solely a driving friction wheel having a diameter sufficient to cause the periphery thereof to be engaged with the capstan of the record player when the tape player is inserted therein.

5. The apparatus of claim 1 wherein said means drivingly coupled to said shaft includes a first friction drive wheel having a peripheral portion engaging the capstan when the adapter cartridge is inserted into a tape player, and a second friction wheel having a major diameter portion and a minor diameter portion, said minor diameter portion engaging the periphery of said first drive wheel and said major diameter portion engaged with said drive shaft to rotate the same and to produce an electrical output from said generator.

6. The apparatus of claim 5 wherein said major diameter portion of said second friction wheel includes a beveled peripheral surface to engage a correspondingly beveled drive wheel secured to said shaft to rotate the same and produce an electrical output from said generator.

* * * * *